United States Patent [19]

Berger

[11] 4,308,582

[45] Dec. 29, 1981

[54] PRECURSORY SET-UP FOR A WORD PROCESSING SYSTEM

[75] Inventor: David A. Berger, Austin, Tex.

[73] Assignee: International Business Machines Corp., Armonk, N.Y.

[21] Appl. No.: 762,378

[22] Filed: Jan. 25, 1977

[51] Int. Cl.³ .................................... G06F 9/06

[52] U.S. Cl. .................................... 364/300

[58] Field of Search ... 364/200 MS File, 900 MS File, 364/300

[56] References Cited

U.S. PATENT DOCUMENTS

| | | | |
|---|---|---|---|
| 3,533,076 | 10/1970 | Perkins et al. | 364/200 |
| 3,585,597 | 6/1971 | Holmerud | 364/200 |
| 3,618,032 | 11/1971 | Goldsberry et al. | 364/900 |
| 3,654,609 | 4/1972 | Bluethman et al. | 364/200 |
| 3,737,863 | 6/1973 | Rowland et al. | 364/200 |
| 3,815,104 | 6/1974 | Goldman | 364/200 |
| 3,949,375 | 4/1976 | Ciarlo | 364/200 |
| 3,996,562 | 12/1976 | Reach et al. | 364/200 |
| 4,010,356 | 3/1977 | Evans et al. | 364/900 X |

OTHER PUBLICATIONS

Burroughs Series L2000 Electronic Billing Computer, Jan. 1969.

IBM Brochure, Storage and Information Retrieval System/Virtual Storage–Thesaurus and Linguistic Integrated System, Aug. 1976.

*Primary Examiner*—Gareth D. Shaw
*Assistant Examiner*—Thomas M. Heckler

[57] ABSTRACT

A control system presents to a user, in the user's native language, the list of acceptable functions that a word processing system can perform. After the user selects the name of the desired function, the control system automatically builds a list of control parameters for executing the selected function and presents these control parameters to the user. Each of the control parameters has a range of values associated with it. The user may select the predetermined set of "standard" values which are the first presented for each parameter, or may cause each parameter in turn to present its range of values, any one of which may be selected. The selected parameters are then converted to machine usable language and inserted into the selected function program.

11 Claims, 10 Drawing Figures

PRECURSORY SET-UP FOR A WORD PROCESSING SYSTEM

BACKGROUND OF THE INVENTION

1. Field of the Invention

This invention relates to word processing systems and, more specifically, to a method and apparatus for defining initial processing parameters.

2. Description of the Prior Art

In prior art word processing machines, initial set up of processing parameters (margins, tabs, line spacing, etc.) was done through the use of buttons and switches on the operator keyboard. These machines performed limited data handling functions.

With the advent of LSI circuits has come increased word processing machine function capability which has led to more buttons and switches on the operator's keyboard. However, the functional development of word processing machines has been hampered because of the limitations on acceptable keyboard size and because the increased complexity requires much more training for the user.

SUMMARY OF THE INVENTION

Means are provided in a word processing system for selecting a wide range of processing parameters while minimizing keyboard complexity and the amount of knowledge required of the user. The system is capable of performing a number of tasks (functions). As part of the power-on sequence of the system, a ring containing the names of system tasks is displayed to the user in the user's native language. The ring may be scrolled until the desired task name appears on the screen. Selection of the desired task invokes parameter list handling apparatus which builds in memory a list of operating parameters to control the performance of the selected task. The task parameters are set up with a predetermined list of values which are displayed to the user. The user then has the option to use the predetermined parameter values or to alter any one or all of the parameter values. The list of acceptable parameter values is stored with each parameter name and is displayed one value at a time to the user who makes a selection. After the selection of the parameter list is completed, the parameter values are converted to machine usable language and inserted into the selected function program. The selected values are also stored with the job and will be automatically recalled the next time the job is used.

DESCRIPTION OF THE PREFERRED EMBODIMENT

Figure 1:
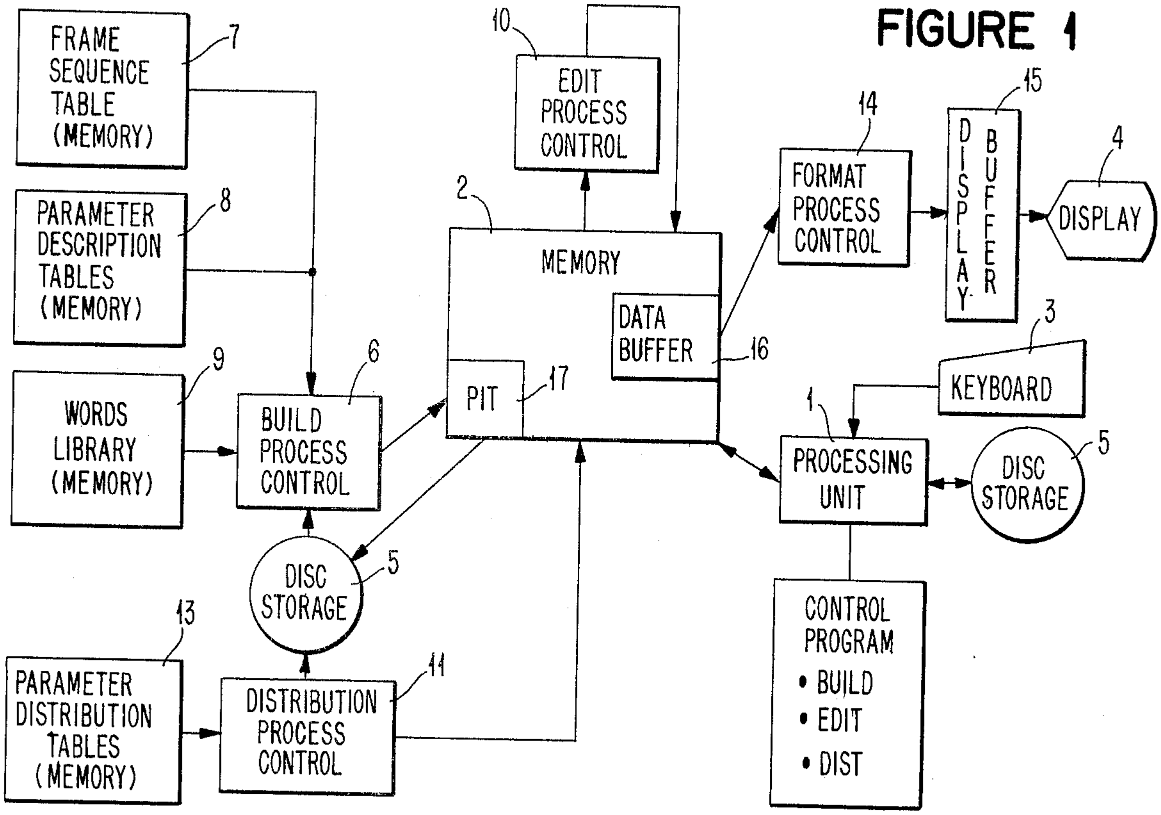
FIG. 1 represents the apparatus used to set up the operating parameters for a word processing system.

Referring to FIG. 1, there is shown a word processing system which includes a processing unit 1, a main memory 2, a keyboard 3, and a disk storage file 5. A display 4 is driven by a buffer 15 and format controller 14 which is connected to main memory 2. The display 4 may be of the well known cathode ray tube type and the keyboard 3 a standard typewriter keyboard. The disk storage file 5 may be of the conventional rotating magnetic disk type. An example of a conventional system that includes a suitable processor, keyboard, display and disk storage files onto which the BUILD, EDIT and DISTRIBUTE functions can be programmed is the IBM 1130 computer system announced for sale in February, 1965.

Build process controller 6 has its output connected to main memory 2. Build process controller 6 constructs, for display on display 4, information to allow the user to select a task and to specify parameters pertinent to that task. The inputs to the build process controller 6 are parameter description tables 8, words library 9, and disk storage file 5. The frame sequence table 7 provides a starting address in the parameter description tables 8 for each "frame" of parameters associated with the selected task. Since all the parameters required to describe a task may not be displayed on the display 4 in a single frame, several addresses may appear in the frame sequence table indicating several frames of parameters which can be addressed.

The parameter description table 8 contains encoded information sufficient to describe each parameter of the task in terms of words used to identify the parameter, maximum value of maximum length of the parameter, minimum value, default value or address where located, and a unique identification number to allow special processing by the build, edit, and distribution controllers. Each of the many parameters used to describe a task is represented by a sequence of bytes of storage sufficient to describe it for the build, edit, and distribution controllers. Parameters are stored in the parameter description tables 8 in the order in which they are to be displayed. The starting point for a particular group of parameters in the parameter description table 8 depends on the task selected.

The words library 9 contains the words used to describe each parameter in the user's native language. A byte of information in the parameter description table 8 gives the address of the starting point for the word or phrase used to identify the parameter in question.

The disk storage file 5 contains the parameter values for tasks which have been previously processed. When a previously processed job is recalled, the parameter values stored on the disk storage file 5 are used in the build process instead of the default values normally used.

The parameters selected by the build process controller 6 are stored in the Parameter Information Table (PIT) 17 in main memory 2.

The edit process controller 10 is connected to main memory 2 and operates the display 4 through the data buffer 16 in conjunction with the processing unit 1 and the keyboard to move the display cursor to parameters on the display which need changing and update. The edit process controller 10 enables the user to rotate "scroll" rings of parameters values on the display until the desired parameter value is present on the screen.

The user can then select the desired parameter value by leaving it visible on the display screen. In the case where the parameter is a "free key" parameter, the edit process controller permits the user to enter data from the keyboard. What is meant by a free key parameter will be fully explained below.

The distribution process controller 11 performs the function of distributing the selected parameter options stored in the PIT 17 to the selected task program stored in main memory 2 and initially entering the program. The distribution process controller 11 has as its input parameter distribution table 13 which contains the address where each selected parameter value is to be stored for use in completing the selected task. In addition, the parameter distribution table 13 contains the start address of the program required to properly format the value for use by the task control program, i.e., converting the parameter to machine usable language.

Referring now to FIGS. 3A–3E, a more detailed description of the operation of the build process controller 6 is shown. The power on sequence 300 of the system initiates task selection 301 wherein a ring of the acceptable tasks which can be performed by the system is presented to the user on display 4. The user controls the display of tasks names through the keyboard 3 by pressing a select keybutton which causes the list of task names to be sequentially displayed. As the range of task names is presented the system keeps track of which of the tasks is presently on the display, i.e., task 1-N shown in blocks 302, 303 and 304. Selection of a task name causes the program to point to the address of that task in the frame sequence table 7. Each task has a different associated sequence of frames in the frame sequence table 7 as is shown in blocks 305, 306 and 307. Once the frame sequence has been identified, a test is made in block 308 to determine if the task undertaken is a new job. If the task is not a new job then the parameter values which were stored with the job on disk storage file 5 when it was created are recalled by block 309 into the build process controller 6. If the selected task is a new job, then the default parameter values for the task are loaded at 310 from the parameter description tables 8.

The next step in the operation is to clear the display at 311 and initialize the data buffer 16 and the display buffer 15 at 312. After the display has been initialized, the address of the frame sequence in the parameter description table 8 is loaded from frame sequence table 7 at 313. All the parameters required to describe a task may not be displayed in a single frame therefore, several addresses may appear in the frame sequence table indicating several frames of parameters which are to be used. The frame addresses are tested at 314 and the loop consisting of 315, 316, 313 and 314 is repeatedly executed until all the frame addresses for the task are loaded from the frame sequence table. A subroutine for building a frame is executed at 315 and is further described in FIG. 3B. After the frame addresses are loaded from the frame sequence table the parameters are taken from the parameter description table and stored in the data buffer for the display at 317. Then the system executes a "wait" at 318 awaiting a keyboard operation from the user.

Figure 3A:
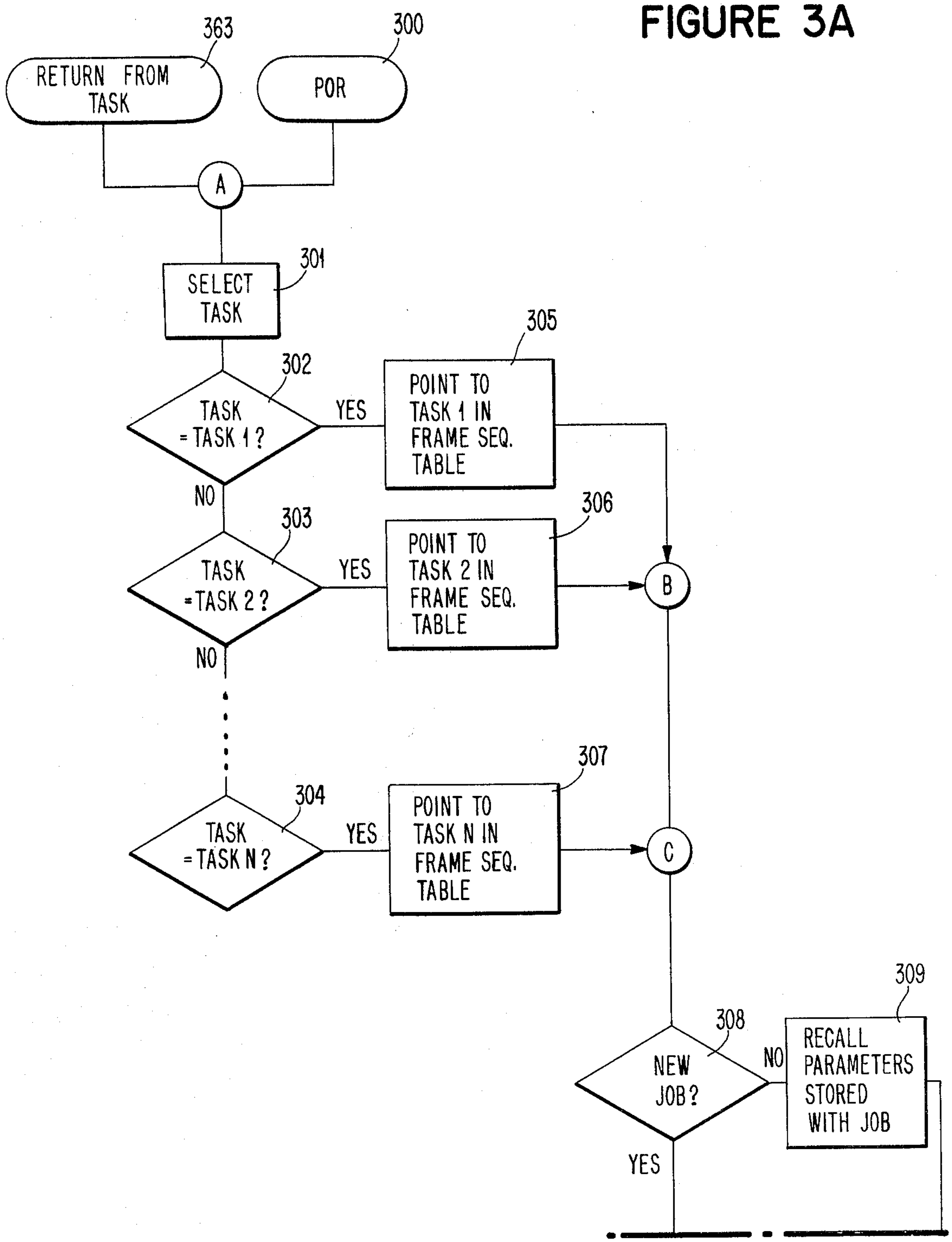
FIGS. 3A–3E show the manner in which the apparatus of FIG. 1 is operated to execute the BUILD function of FIG. 2.
Figure 3B:
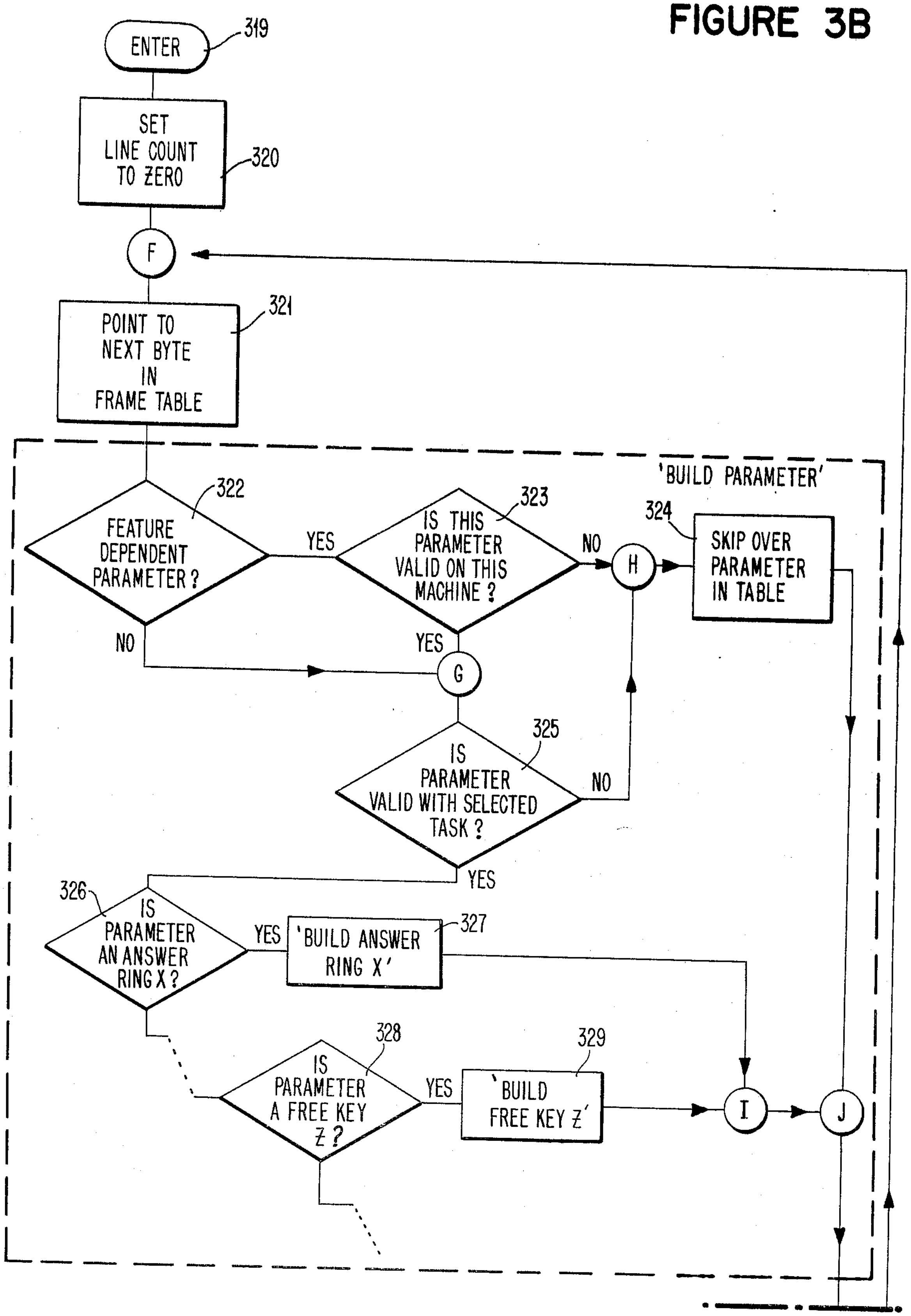

Referring now to FIG. 3B, the procedure for building a frame of data in 315 of FIG. 3A' will be described. The program enters the build frame subroutine at 319. The line count for the frame is initialized to zero at 320. The frame sequence table provides the address of the first parameter in the parameter description table 8 at 321. The parameter is then tested to determine if it is feature dependent at 322. By feature dependency, it is meant that the parameter is tested to determine if it depends on the system configuration, i.e., whether the system has a printer, or a card deck, or etc. If the parameter is feature dependent, it is tested to determine whether or not it may be validly executed on this machine at 323. That is, the machine that is being used is tested to see if it has the required apparatus and if this apparatus is available for use by the job. If the machine does not have the required apparatus, or the apparatus is unavailable, then this parameter is excluded from the parameter set up. Provision of the foregoing test allows the blocks of data in the parameter description table to broadly include all functions that may be executed on any machine in a family of machines of varying functional capability. These tests then mold the functional table to conform to the particular machine of the family that is currently in use.

If the parameter is determined to be valid on the machine that is in use then it is tested to determine if it is valid with the particular task that has been selected at 325. If not, then once again the parameter is skipped over at 324. This test molds the parameter table to conform to the job that has been selected. The parameter is then tested to determine whether or not it is an answer ring at 326 or a free key field at 328.

An answer ring parameter is one in which the selection choices for the parameter are displayed to the user as well as the name of the parameter. For example, PITCH is the parameter which defines the number of characters per inch to be printed. This parameter would be presented to the user on the display with an answer ring which contains the numbers 10 and 12. These numbers would be displayed to the user one at a time and the user allowed to select the desired pitch number by positioning the display cursor beneath the parameter and repeatedly depressing a "select" keybutton on the keyboard until the desired number is present on the display. If the parameter is an answer ring parameter then the answer ring is constructed at 327 which will be discussed in more detail in conjunction with FIG. 3C. The answer ring is labeled "X" and the continuation line provided between 326 and 328 to indicate that the parameter list might include many different answer rings each of which may require a unique processing to build.

If the parameter is a free key field at 328 then the build free key subroutine is entered at 329. This subroutine will be discussed in more detail in conjunction with FIG. 3D. Suffice it to say at this point that a free key field is one in which the user must enter from the keyboard the data for the parameter. For example, HEADING is a free key parameter wherein the user would enter a label to be printed at the top of each page. Like the answer ring, there may be a variety of free key parameters each of which may require unique processing to construct. After the parameter is constructed, the operation continues through nodes I and J to 330 where a test is executed to determine if the parameter was the last parameter on this line of the frame. If the parameter was not the last parameter on this line of the frame, then node F is branched to and the next parameter is constructed. If the parameter was the last parameter on this line of the frame, at 331 a line end code is installed in the data buffer 16 in main memory 2 and the line counter is advanced one count at 332. The frame is then tested at 333 to determine if all lines have been installed in the frame. If all lines have not been installed in this frame, then node F is branched to and the next line of the frame is started. If all lines have been installed in the frame, then the subroutine is exited at 334 and the next address in the frame sequence table is advanced to in 316 of FIG. 3A'.

Figures 3B, 3C:
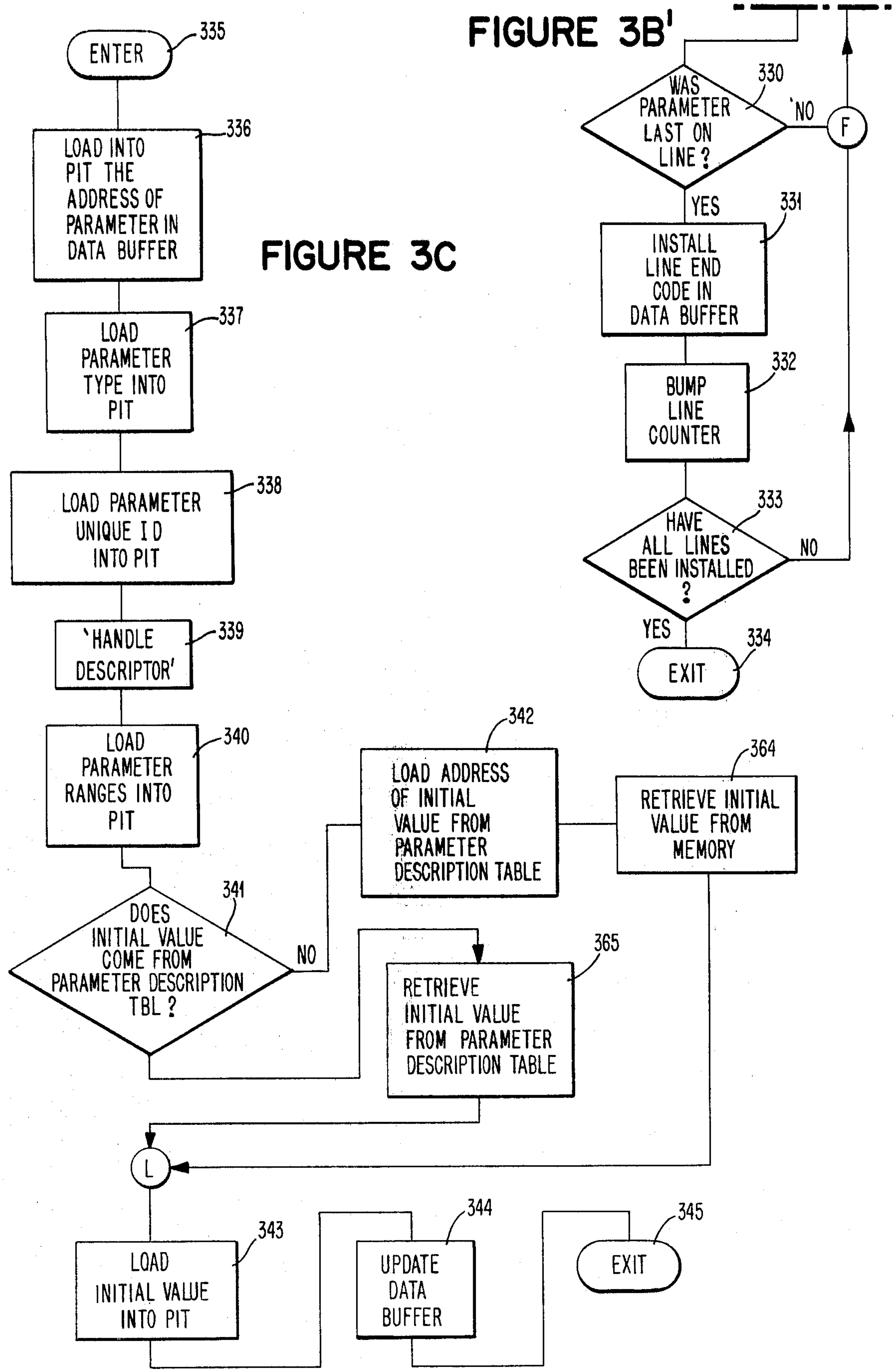

Referring now to FIG. 3C and block 327 of FIG. 3B, the subroutine for building an answer ring will be discussed. The subroutine is entered at 335. The information for building the answer ring comes from the parameter description table 8. Each of the many parameters used to characterize a task is represented by a sequence of bytes of storage sufficient to describe it in the parameter description table 8. The parameters are stored in the parameter description table 8 in the order in which they are to be displayed. At 336, the address at which the parameter will be stored in the data buffer 16 is loaded into the parameter information table 17. The parameter information table (PIT) is a controlled space in main memory 2 which will be utilized by the distribution process controller 11 and the locate/edit controller to be discussed below. The parameter type and parameter unique ID are then loaded from the parameter description table 8 into the PIT 17 at 337 and 338. The parameter type defines what kind of parameter is being built, that is, whether the parameter is a free key parameter or an answer ring parameter. The unique ID code then defines which of the many free key or answer ring parameters is being used.

Figures 3D, 3E:
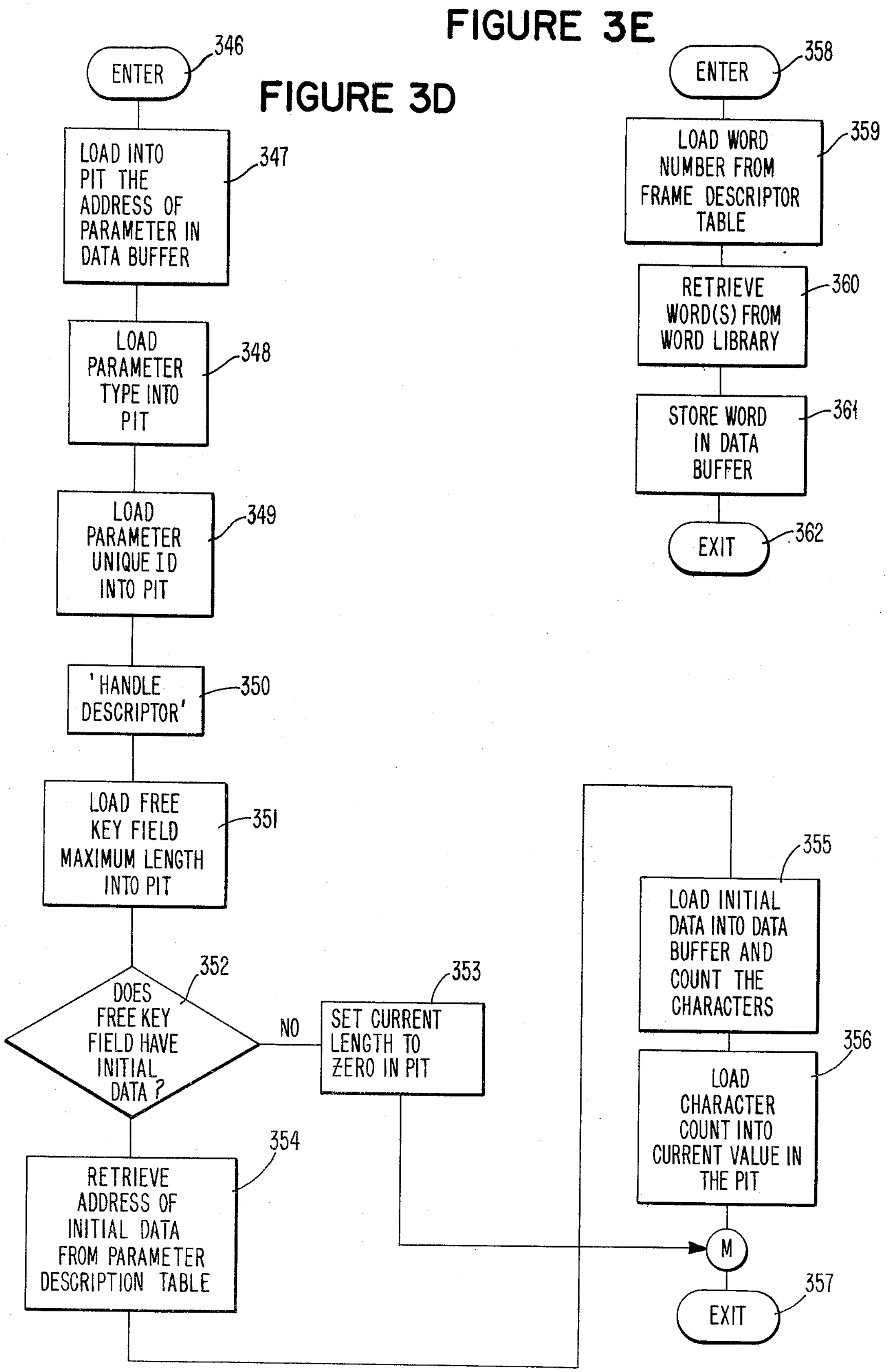
Figure 3A:
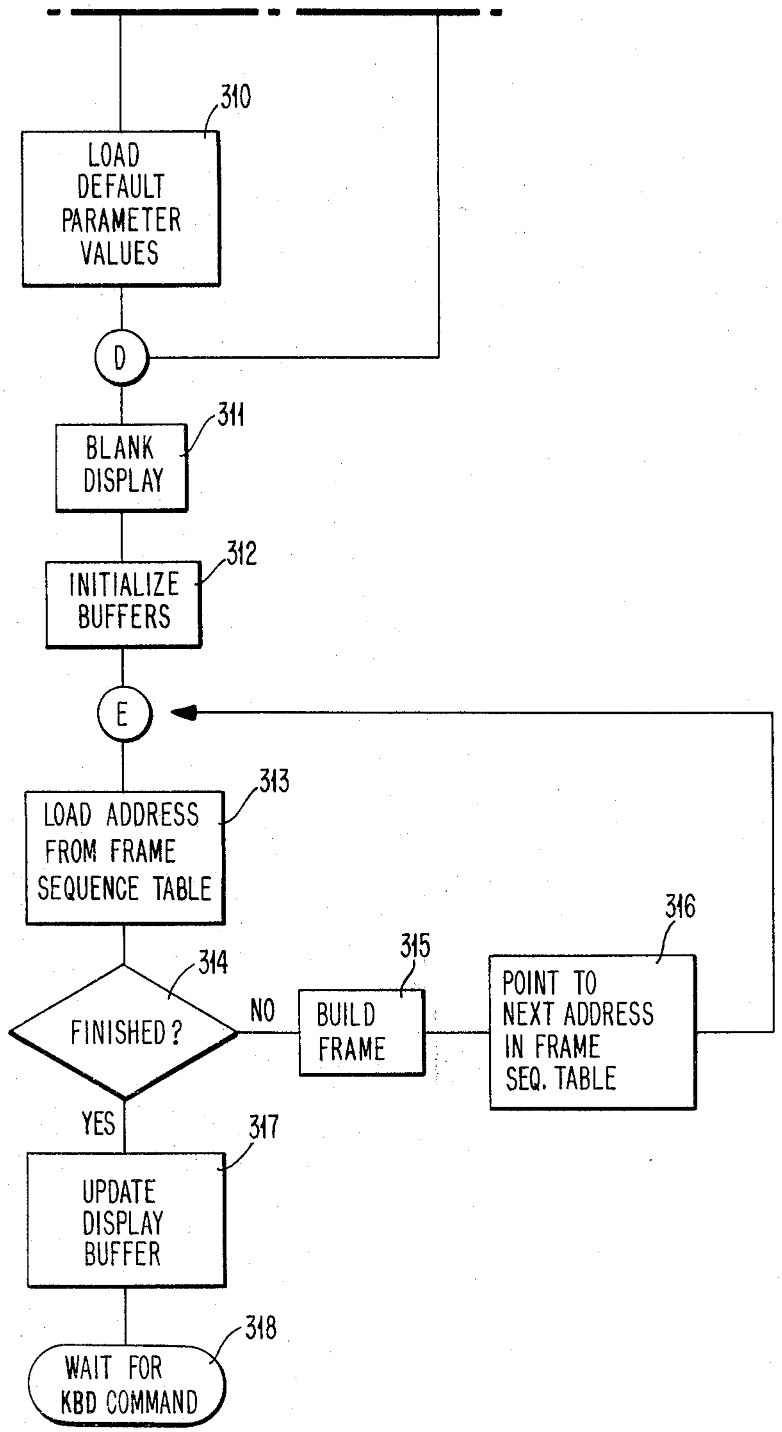

The next block of data in the parameter description table following the unique ID code is used by the handle descriptor subroutine 339 which is more fully disclosed in FIG. 3E and points to an address in the word library 9. The word library 9 contains the words in the user's native language (English, French, Spanish, etc.) used to describe each parameter on the display. The byte of information in the parameter description table 9 gives the address of the starting point for the word or phrase used to identify the parameter in question in the word library 9. As can be seen in FIG. 3E, the handle descriptor subroutine is entered at 358 and the word address in word library 9 is loaded from the frame descriptive table into the subroutine at 359. The word or words involved is then retrieved from the word library 9 at 360 and stored in the display data buffer at 361. The handle descriptor subroutine is exited at 362 and returns processing to 340 in the build answer ring subroutine of FIG. 3C.

The next byte of data in the parameter description table 8 gives the ranges for the parameter, that is the maximum and minimum values the parameter can have. The parameter range values are loaded into the PIT 17 at 340.

The parameter is then tested at 341 to determine if the initial value for the parameter which will be displayed on the display comes from the parameter description table or from disk. This determination is made by examining the unique ID code for the parameter. If the initial value for the parameter does not come from the parameter description table 8 then the next byte of data in the parameter description table provides the disk address at which the initial value for the parameter is located. This address is loaded from the parameter description table into the build process controller 6 at 342. Then the initial value for the parameter is retrieved from disk at 364. However, if the initial value for the parameter was located in the parameter description table then the result of the test at 341 would point to 365 and the initial value would be retrieved from the parameter description table. After the initial value has been retrieved, processing passes through node L and the initial value is loaded into PIT 17 at 343. Once the initial parameter value has been loaded into the PIT 17, it is used to update the contents of the data buffer 16 at 344 and the build answer ring subroutine is exited at 345 which returns the processor to node I of FIG. 3B.

If the test at 328 in FIG. 3B had determined that the parameter was a free key parameter then the build free key subroutine 329 would have been entered. FIG. 3D is a detailed drawing of the free key subroutine 329 of FIG. 3B. The subroutine is entered at 346 and the address where the parameter will be stored in the data buffer 16 is loaded into the PIT 17 at 347. The next byte of data for the free key parameter in the parameter description table 8 is the parameter type which is loaded into the PIT 17 at 348. At 349, the parameter unique ID is loaded into the PIT 17 from the parameter description table 8. Then the handle descriptor subroutine of FIG. 3E is entered at 350 and operates as was previously described in connection with the build answer ring subroutine to load the words describing the parameter from the word library 9 into the data buffer 16.

The next byte of data for the free key parameter in the parameter description table 8 specifies the maximum length of the free key field. This byte of data is loaded into the PIT 17 at 351. At 352, the free key field ID is tested to determine if the free key field has initial data. If the free key field does not have initial data then the current length byte for the field is set to zero in the PIT 17 at 353. The subroutine then branches to the node M and exits at 357 to node I of FIG. 3B. If the free key field does have initial data then the address of this initial data is retrieved from the parameter description table at 354. The initial data is then loaded into the display data buffer at 355 and the number of its characters is counted. The character count is then stored in a byte called current value in the PIT 17 at 356 for use during the parameter edit subroutine and the free key subroutine is exited at 357 to node I in FIG. 3B.

Figure 4A:
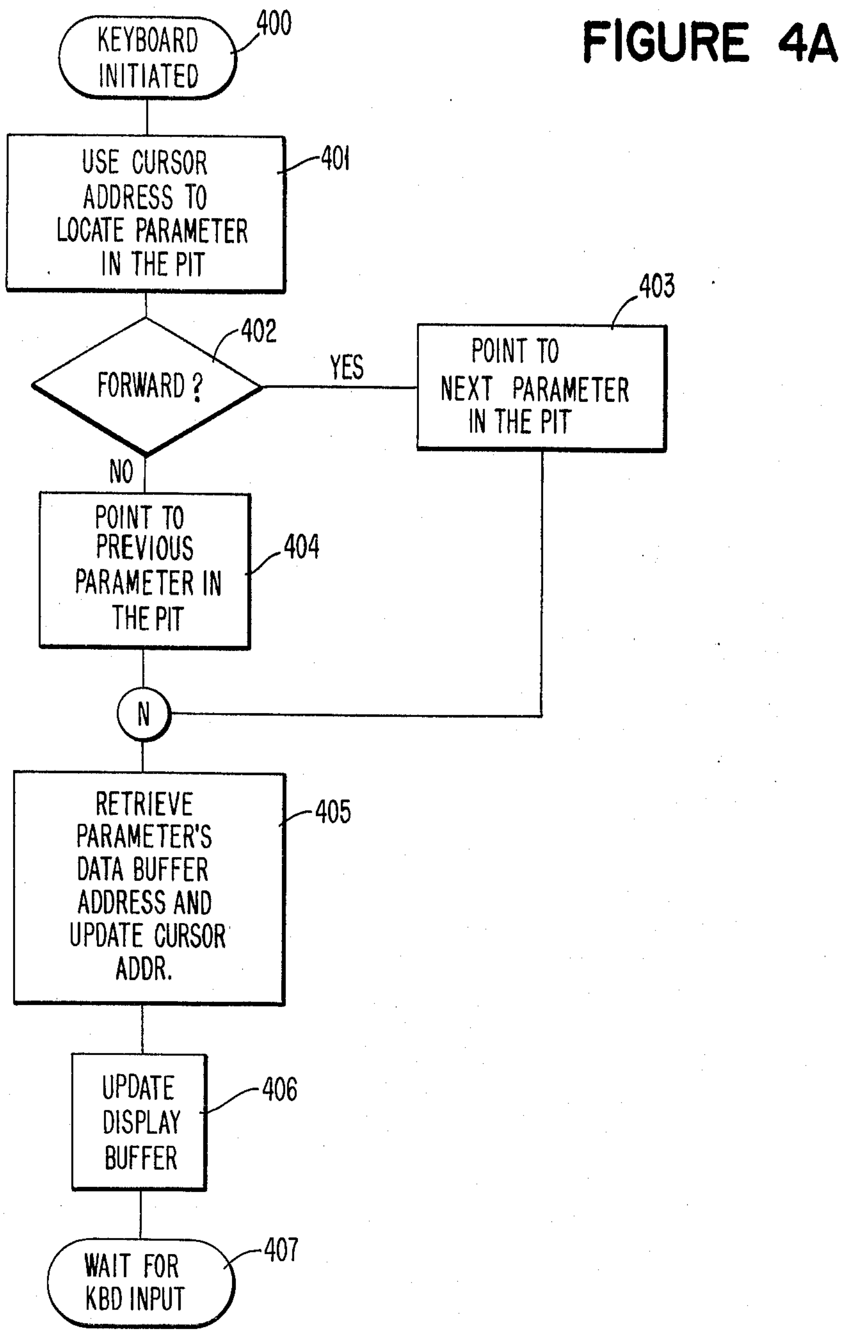
FIGS. 4A–4B' shows the manner in which the apparatus of FIG. 1 is operated to execute the LOCATE/EDIT function of FIG. 2.

As was previously stated, after the completion of the build parameter routine of FIG. 3A the system waits for a keyboard command to be initiated by the user. At this point, a frame of parameter names with their associated initial values is visible to the user on the display 4. The user can now locate any parameter in the frame being displayed and change the parameter value. The user has the option to advance the display to the next frame which will result in the initial values for the currently displayed parameters be selected by default or to change some of the values and let the others be selected by default. Referring to FIG. 4A the user must activate a key on the keyboard at 400 in order to move the display cursor from parameter to parameter within the frame if the user desires to change some of the parameters. The locate routine uses the cursor address in the data buffer 16 to locate the parameter in the PIT 17 at 401. It will be recalled that the parameter information table 17 was constructed simultaneously with the storing of the parameter data in the data buffer 16 and therefore, is in the same order as the data in data buffer 16. Cursor movement is tested at 402 to determine whether the cursor is being moved forward or backward on the display. If the cursor is being moved forward then each movement of the cursor causes the locate routine to point to the address of the next parameter in the PIT at 403. If the cursor is being moved backwards then each movement of the cursor causes the locate routine to point to the previous parameter in the PIT at 404.

The parameter's data buffer address is retrieved from the PIT 17 and used to update the cursor address in data buffer 16 at 405. This new cursor address is loaded into the display buffer 15 and causes the cursor to be positioned underneath the portion of the parameter which can be changed by the user from the keyboard. The system now waits further action by the user from the keyboard at 407.

Figure 4B:
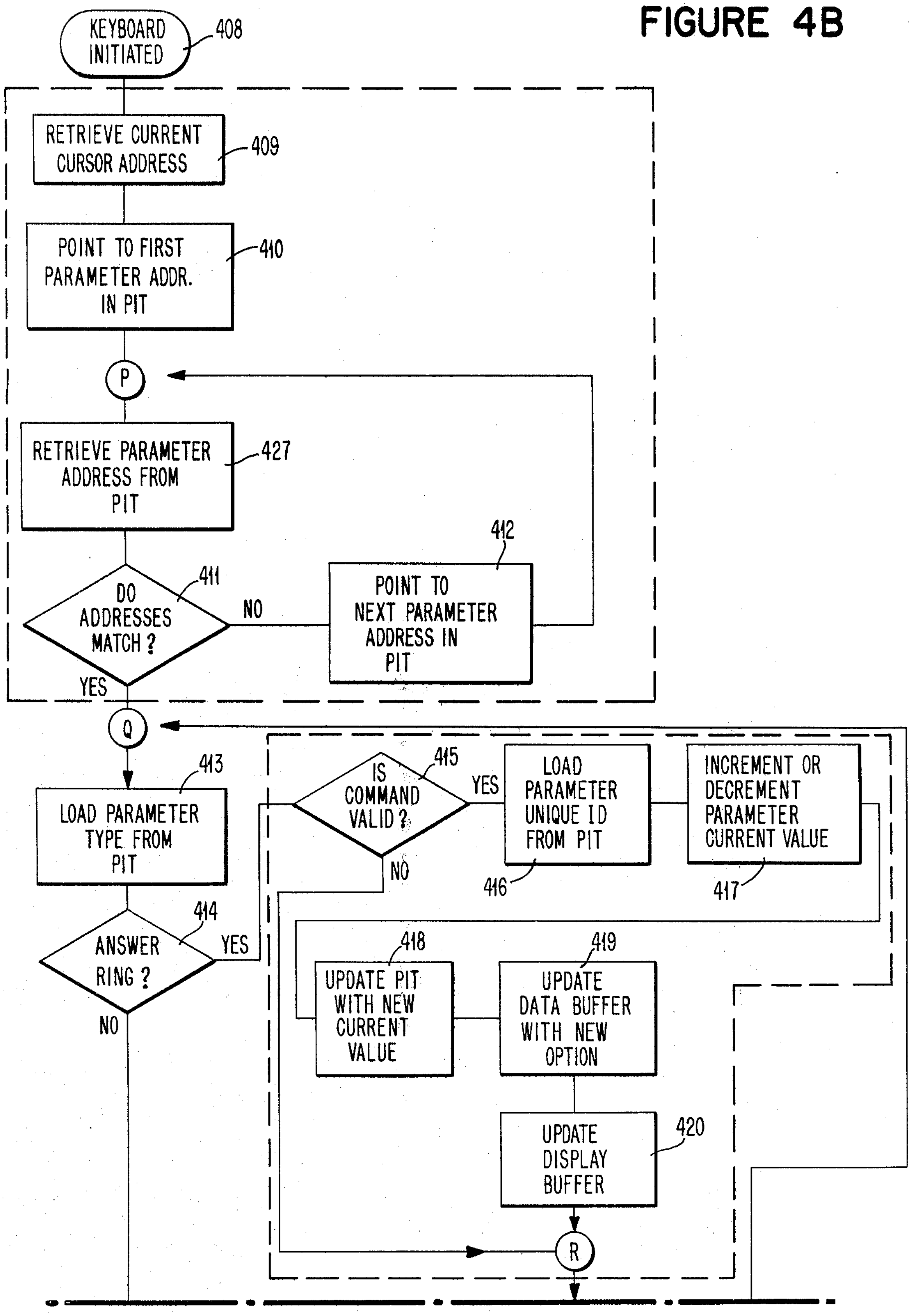
Figure 4B:
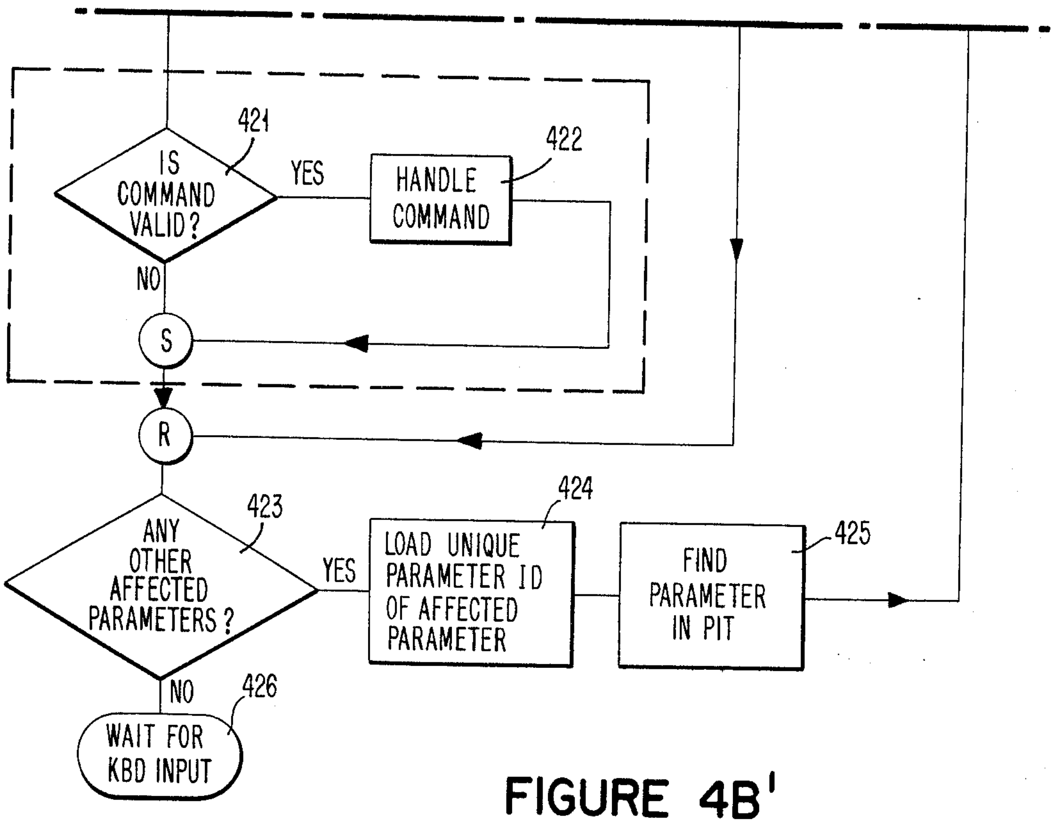

If the user wishes to change the parameter, a signal is initiated from the keyboard at 408 in FIG. 4B. This signal causes the edit routine to retrieve the current cursor address at 409 and to point to the first parameter address stored in the PIT 17 at 410. The parameter's data buffer address is retrieved from the PIT at 427 and compared to the cursor address at 411. If the parameter address in the PIT 17 does not match the current cursor address then the routine points to the next parameter address in the PIT at 412 and repeats the procedure through node P until a parameter address is found in the PIT 17 which matches the current address of the cursor.

When the parameter is found whose address matches the current address of the cursor, the parameter's type code is loaded from the PIT into the edit process controller 10 at 413. The type code is then tested to determine if the parameter is an answer ring at 414. If the parameter is an answer ring, then the command which was entered by the user on the keyboard is tested for validity at 415. If the command is not valid then the edit process controller 10 branches to node R in the edit routine. If the command is valid then the parameter's unique ID is loaded from the PIT 17 to the edit process controller 10. The parameters unique ID code causes the parameter value to be either incremented or decremented at 417. Once the parameter has been changed in the edit process controller 10 its new value is used to update the PIT 17 at 418 and to update the data buffer 16 at 419 which in turn updates the display buffer 15 at 420.

After a parameter value has been changed, the remaining parameters are tested to see if the change has affected their current values. This occurs where there is some interdependency between the parameter values as for example, between the parameters for the right and left margins. If a parameter is affected by the change which was made to the current parameter, then the edit process controller will update the affected parameter. The unique ID number of the affected parameter is loaded into the edit process controller at 424 and the PIT is searched for that parameter at 425. When the affected parameter is found in the PIT, the edit routine branches to node Q and the parameter type is loaded from the PIT into the edit process controller 10 at 413 and the parameter is updated as was previously discussed.

If the parameter type indicates that the parameter was not an answer ring then by default the parameter must be a free key parameter. The command to edit the parameter is tested at 421 to determine its validity. If the command is valid, then it will be handled at 422 to accomplish one of the following functions: insert a character; delete a character; move the cursor by character, word, line or frame.

After the free key parameter is edited control passes through node S to node R and it is also tested to determine if a change in it has affected any other parameter values. If not, then the system goes into a wait state at 426 and awaits additional user input from the keyboard.

Figure 5:
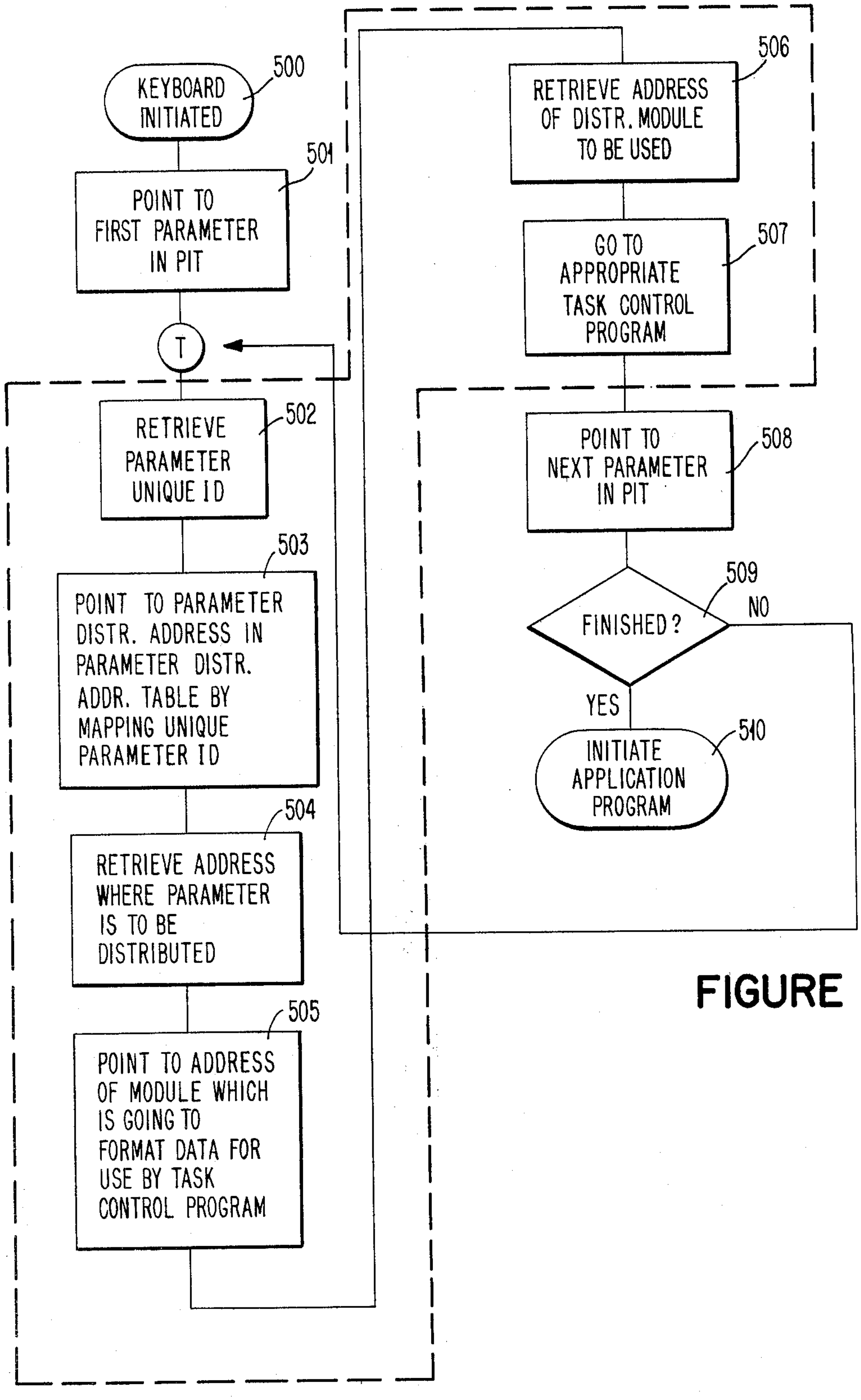
FIG. 5 show the manner in which the apparatus of FIG. 1 is operated to execute the DISTRIBUTE function of FIG. 2.

After all the parameters have been edited to meet the requirements of the user, the distribution process controller 11 is invoked by a keyboard signal initiated by the user at 500 in FIG. 5. The distribution program points to the first parameter in the PIT at 501 and, specifically, to the unique ID code which is retrieved from the PIT 17 at 502. The parameter's unique ID is decoded at 503 to point to the address in the parameter distribution address table which identifies where the parameter is to be sent. This address is retrieved from the parameter distribution table 13 into the distribution process controller 11 at 504. The address retrieved points to the address of a program module which is to be used by the processing unit 1 to format the parameter data for use by the task control program at 505. The distribution module is retrieved at 506 and is used to properly format the parameter value for use by the task control program at 507. The distribution process program then points to the next parameter in the parameter information table 17 at 508. A test is conducted at 509 to determine if the parameter just finished was the last parameter in the parameter information table. If not, the distribution process program branches to node T and continues to process the parameters for distribution. After the last parameter has been processed, the process distribution program initiates the application program which will perform the selected task at 510.

Figure 2:
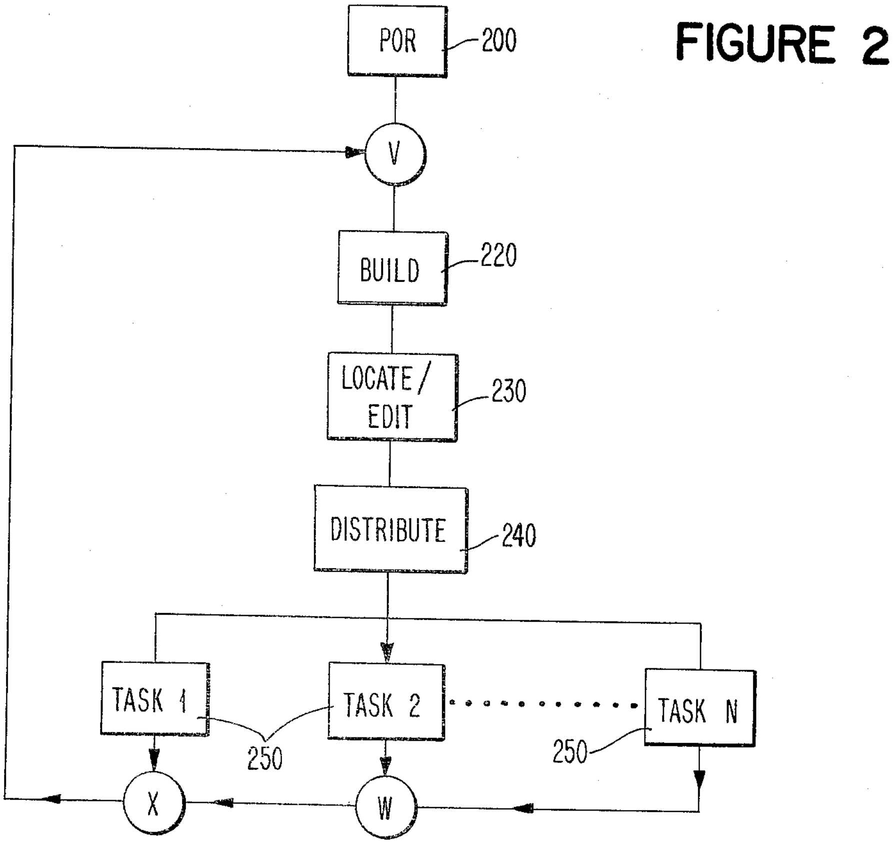
FIG. 2 is a functional diagram showing the operating steps performed by the apparatus of FIG. 1.

The operation of the system can be summarized by referring to FIG. 2. When power is turned on the system at 200, the system is initialized and the build process is invoked at 220. The build process 220 constructs on the display information to allow a user to select a task and specify the parameter pertinent to that task. After the task has been selected the locate/edit process 230 enables the user to move the cursor to the parameters in that task which needs changing and to update those parameters. After the parameters have been updated, distribute process 240 reformats the information shown on the display into a machine usable form and distributes the information to the appropriate memory locations for use by the selected task program. The distribute process 240 also calls up the selected task program. The task program is then executed at 250 to allow the user to perform any one of a number of system functions; revise, print, communicate, sort, etc. After the selected task has been completed, control is returned to node T whereby a new task may be selected and the entire process repeated for the new task.

In the preferred embodiment, the build, locate/edit and distribute process programs are in microcode and permanently stored in a read only memory.

While this invention has been illustrated in the preferred embodiment thereof, it will be understood that various changes in detail may be made by those of ordinary skill in the art within the scope of the invention as expressed in the appended claims.

What is claimed is:

1. In a word processing system including a CPU, a main memory, a plurality of auxiliary memories containing tables of program instructions executable by the CPU, and input/output devices including a keyboard and display, the method of constructing a task program for operating the word processing system comprising the steps of:

(a) transferring a file of task program names from a first auxiliary memory to said main memory, said file of task program names being selected to conform to the configuration of the word processing system;

(b) displaying said file of task program names;

(c) selecting one task program in response to an operator input from said keyboard;

(d) transferring to said main memory from a second auxiliary memory a table of program instruction operating parameters for the selected task program;

(e) displaying said table of operating parameters to the operator;

(f) selecting from said table a set of operating parameters for the selected task program in response to operator inputs from said keyboard; and (g) storing the set of operating parameters in the main memory for use by the selected task program for controlling the operation of the word processing system.

2. The method of claim 1 wherein said file of system task program names is displayed in the user's native language.

3. The method of claim 1 where transferring a table of operating parameters includes transferring only operating parameters which correspond to the system configuration and wherein selecting a set of operating parameters includes selecting only operating parameters which correspond to the selected task program.

4. The method of claim 3 wherein storing the subset of operating parameters includes storing the subset of operating parameters with the task program for future recall.

5. A method for defining task program parameters in a word processing system which includes a CPU, a main memory, a plurality of auxiliary memories, and input/output devices including a keyboard and a display comprising the steps of:

(a) storing a plurality of task programs, a plurality of operating control parameters, and a range of operating values for the control parameters in said plurality of auxiliary memories;

(b) displaying said task programs for viewing by an operator;

(c) selecting one of said task programs in response to an operator input from said keyboard;

(d) displaying from among said plurality of operating control parameters those parameters which correspond to the system configuration and the selected task program;

(e) displaying said range of operating values for the displayed operating parameters;

(f) displaying default values for each displayed operating parameter from within the range of operating values;

(g) selecting an operating value for each of said operating parameters in response to an operator input from said keyboard;

(h) assembling said displayed operating control parameters into the selected task program; and (i) storing the selected operating values for each of said operating control parameters in the main memory for use by the selected task program for controlling the operation of the word processing system.

6. The method of claim 5 wherein selecting an operating value for each of said operating parameters includes selecting the default value or selecting a value from within the range of operating values.

7. The method of claim 6 wherein storing the selected operating values for each of said operating task program parameters includes storing the selected operating values in a serial input/output storage device for future recall with the selected program.

8. The method of claim 7 further including recalling a previously stored set of parameter values to be used as default values when the selected program is next selected.

9. In a word processing system including a CPU, a main memory, and input/output devices including a keyboard and display, a control system for constructing a task program for operating said word processing system comprising:

a plurality of auxiliary memories containing tables of task program instructions executable by said CPU;

means for selectively transferring a file of task program names from a first one of said auxiliary memories to said main memory, said file of task program means being selected to conform to the configuration of the word processing system;

means for displaying on said display said file of task program names for viewing by an operator; p1 means responsive to an operator input from said keyboard for selecting the task program whose name is currently being displayed; p1 means for transferring to said main memory from a second one of said auxiliary memories a table of program instructions operating parameters for the selected task program;

means for displaying on said display said table of operating parameters for viewing by the operator;

means for selecting from said table a set of operating parameters for the selected task program in response to operator inputs from said keyboard; and p1 means for storing the set of operating parameters in the main memory for use by the selected task program for controlling the operation of the word processing system.

10. The system of claim 9 wherein said table of program instruction operating parameters includes default values for the operating parameters and wherein said means for selecting from said table a set of operating parameters includes means for selecting a default value for each operating parameter.

11. The system of claim 10 wherein said means for storing the set of operating parameters includes means for storing the set of operating parameters for future recall by the selected task program.

* * * * *